(12) United States Patent
Kim et al.

(10) Patent No.: US 11,206,599 B2
(45) Date of Patent: Dec. 21, 2021

(54) MAIN UNIT AND DISTRIBUTED ANTENNA SYSTEM INCLUDING THE SAME

(71) Applicant: SOLiD, INC., Seongnam-si (KR)

(72) Inventors: Do Yoon Kim, Seongnam-si (KR); Hyoung Ho Kim, Seoul (KR); Kwang Nam Seo, Guri-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 16/021,913

(22) Filed: Jun. 28, 2018

(65) Prior Publication Data

US 2018/0310226 A1 Oct. 25, 2018

Related U.S. Application Data

(63) Continuation of application No. PCT/KR2016/003146, filed on Mar. 28, 2016.

(30) Foreign Application Priority Data

Dec. 30, 2015 (KR) ........................ 10-2015-0190368

(51) Int. Cl.
*H04W 40/22* (2009.01)
*H04L 25/02* (2006.01)
(Continued)

(52) U.S. Cl.
CPC .............. *H04W 40/22* (2013.01); *H04B 3/36* (2013.01); *H04B 7/155* (2013.01); *H04L 25/02* (2013.01);
(Continued)

(58) Field of Classification Search
CPC ........... H04B 3/36; H04B 7/155; H04L 25/02; H04L 25/10; H04L 25/20; H04W 40/22;
(Continued)

(56) References Cited

U.S. PATENT DOCUMENTS 6,259,687 B1 * 7/2001 Lomp .................. H04B 7/0894
370/334
9,838,988 B2 12/2017 Lee
(Continued)

FOREIGN PATENT DOCUMENTS

KR 10-2007-0044105 A 4/2007
KR 10-0727076 B1 6/2007
(Continued)

OTHER PUBLICATIONS

International Search Report for PCT/KR2016/003146 dated Sep. 21, 2016.
(Continued)

*Primary Examiner* — Asad M Nawaz
*Assistant Examiner* — Kai Chang
(74) *Attorney, Agent, or Firm* — Sughrue Mion, PLLC (57) ABSTRACT

There is provided a main unit and a distributed antenna system including the same. The main unit for constituting a distributed antenna system that receives a base station signal from at least one base station, transmits the base station signal to at least one user terminal, and includes a plurality of main units, the main unit includes: a first receiver for receiving a first group of base station signals; a second receiver for receiving a second group of base station signals from another main unit; a signal combiner for combining the first and second groups of base station signals; and a delay compensator for compensating for time delay corresponding to a path between the main unit and the other main unit with respect to the first group of base station signals before combining the first and second groups of base station signals.

4 Claims, 8 Drawing Sheets

(51) Int. Cl.
*H04L 25/20* (2006.01)
*H04L 25/10* (2006.01)
*H04B 3/36* (2006.01)
*H04B 7/155* (2006.01)
*H04W 56/00* (2009.01)
*H04W 88/08* (2009.01)

(52) U.S. Cl.
CPC .............. *H04L 25/10* (2013.01); *H04L 25/20* (2013.01); *H04W 56/001* (2013.01); *H04W 88/08* (2013.01); *H04W 88/085* (2013.01)

(58) Field of Classification Search
CPC .. H04W 56/001; H04W 88/08; H04W 88/085
See application file for complete search history.

(56) References Cited

U.S. PATENT DOCUMENTS

| | | | | |
|---|---|---|---|---|
| 10,211,529 | B2* | 2/2019 | Haskell | H01Q 3/2694 |
| 2011/0183681 | A1 | 7/2011 | Park et al. | |
| 2012/0134279 | A1* | 5/2012 | Tamaki | H04B 7/024 |
| | | | | 370/248 |
| 2014/0349630 | A1* | 11/2014 | Hyde | H04B 7/026 |
| | | | | 455/418 |
| 2015/0087329 | A1* | 3/2015 | Stratford | H04W 64/00 |
| | | | | 455/456.1 |
| 2015/0373722 | A1* | 12/2015 | Lange | H04B 17/13 |
| | | | | 370/315 |
| 2016/0134353 | A1* | 5/2016 | Lange | H04B 10/00 |
| | | | | 370/345 |
| 2016/0205006 | A1* | 7/2016 | Kim | H04L 43/0864 |
| | | | | 370/249 |
| 2016/0285601 | A1* | 9/2016 | Kim | H04B 7/0632 |
| 2017/0064642 | A1* | 3/2017 | Tarlazzi | H04B 17/19 |
| 2017/0070975 | A1* | 3/2017 | Ranson | H04B 17/21 |
| 2017/0086255 | A1* | 3/2017 | Jayasimha | H04B 7/0837 |
| 2017/0163328 | A1* | 6/2017 | Tiebout | H04B 7/0408 |
| 2017/0227625 | A1* | 8/2017 | Markhovsky | G01S 1/042 |
| 2017/0311297 | A1* | 10/2017 | Guo | H04B 7/155 |
| 2017/0367061 | A1* | 12/2017 | Kim | H04B 17/10 |
| 2018/0124635 | A1* | 5/2018 | Ranson | H04L 12/56 |
| 2018/0124729 | A1* | 5/2018 | Hanson | H04W 56/004 |

FOREIGN PATENT DOCUMENTS

| | | |
|---|---|---|
| KR | 10-1416667 B1 | 7/2014 |
| WO | 2015/127021 A1 | 8/2015 |

OTHER PUBLICATIONS

Communication issued in the European Patent Office in corresponding European Patent Application No. 16881878.9 dated Jul. 4, 2019.
Communication dated Jul. 9, 2020 by the Korean Patent Office in application No. 10-2015-0190368.
Communication dated Sep. 2, 2019 from the Korean Intellectual Property Office in Application No. 10-2015-0190368.
Communication dated Jun. 3, 2020 from the Korean Intellectual Property Office in Application No. 10-2015-1090638.
Communication dated Jan. 8, 2021 from the Korean Intellectual Property in Application No. 10-2015-0190368.

* cited by examiner

FIG. 8

MAIN UNIT AND DISTRIBUTED ANTENNA SYSTEM INCLUDING THE SAME

CROSS-REFERENCE TO RELATED APPLICATIONS

This application is a Continuation of PCT International Application No. PCT/KR2016/003146, filed Mar. 28, 2016, and claims priority from Korean Patent Application No. 10-2015-0190368, filed Dec. 30, 2015, the contents of which are incorporated herein by reference in their entireties.

BACKGROUND

1. Field

The present invention relates to a distributed antenna system, and more particularly, to a main unit constituting a headend node of a distributed antenna system and the distributed antenna system including the main unit.

2. Description of the Related Art

A distributed antenna system (DAS), which is an example of a relay system relaying communication between a base station and a user terminal, has been used to extend service coverage of the base station so as to provide a mobile communication service even to a shadow area which inevitably appears either indoor or outdoor environments.

The DAS, after receiving a base station signal from the base station and amplifying the base station signal, transmits the amplified base station signal to the user terminal in a service area based on a downlink path, and amplifies a terminal signal received from the user terminal in the service area and transmits the amplified terminal signal to the base station based on an uplink path.

The DAS includes a headend node and a remote node. The headend node is connected between the base station and the remote node, and transmits the base station signal to each remote node. When there are a plurality of remote nodes connected to the headend node, signal transmission time delay at the headend node and each remote node must be compensated so that signals are output from all the remote nodes at the same time.

Meanwhile, in a case of the DAS including a plurality of headend nodes and hub nodes, a combination of signals at the headend nodes, a combination of signals at the hub nodes, or a combination of signals at the remote nodes may be required. In this case, it is difficult to guarantee the quality of relayed signals only by time delay compensation of the remote nodes.

SUMMARY

The present invention is directed to, when a combination of signals at headend nodes, a combination of signals at hub nodes, or a combination of signals at remote nodes is required, a main unit for compensating for time delay over a plurality of operations to ensure the quality of relayed signals, and a distributed antenna system including the main unit.

According to an aspect of the present invention, a main unit for constituting a distributed antenna system that receives a base station signal from at least one base station, transmits the base station signal to at least one user terminal, and includes a plurality of main units, the main unit includes a first receiver for receiving a first group of base station signals; a second receiver for receiving a second group of base station signals from another main unit; a signal combiner for combining the first and second groups of base station signals; and a delay compensator for compensating for time delay corresponding to a path between the main unit and the other main unit with respect to the first group of base station signals before combining the first and second groups of base station signals.

In an example embodiment, the main unit may further include a transmitter configured to transmit the combined signals to at least one remote unit.

In an example embodiment, the main unit may further include a transmitter configured to transmit the combined signals to another remote unit.

According to another aspect of the present invention, a distributed antenna system that receives a base station signal from at least one base station and transmits the base station signal to at least one user terminal, the distributed antenna system includes a first main unit for receiving a first group of base station signals; and a second main unit for receiving a second group of base station signals, wherein the first main unit receives the second group of base station signals from the second main unit and combines the first and second groups of base station signals, and compensates for time delay corresponding to a path between the first main unit and the second main unit with respect to the first group of base station signals before combining the first and second groups of base station signals.

According to another aspect of the present invention, a main unit for constituting a distributed antenna system that receives a base station signal from at least one base station, transmits the base station signal to at least one user terminal, and includes a plurality of main units, the main unit includes a receiver for receiving a first group of base station signals; a transmitter for transmitting the first group of base station signals to a hub unit; and a delay compensator for compensating for time delay corresponding to paths between the plurality of main units and the hub unit with respect to the first group of base station signals before transmitting the first group of base station signals to the hub unit.

According to another aspect of the present invention, a distributed antenna system that receives a base station signal from at least one base station and transmits the base station signal to at least one user terminal, the distributed antenna system includes a first main unit for receiving a first group of base station signals; a second main unit for receiving a second group of base station signals; and a hub unit for receiving the first group of base station signals from the first main unit, receiving the second group of base station signals from the second main unit, and combining the first and second groups of base station signals, wherein the first main unit compensates for time delay corresponding to paths between the first and second main units and the hub unit with respect to the first group of base station signals.

According to another aspect of the present invention, a distributed antenna system that receives a base station signal from at least one base station and transmits the base station signal to at least one user terminal, the distributed antenna system includes a first main unit for receiving a first group of base station signals; a second main unit for receiving a second group of base station signals; and at least one remote unit for receiving the first and second groups of base station signals from the first main unit and combining the first and second groups of base station signals, wherein the first main unit receives the second group of base station signals from the second main unit and transmits the first and second groups of base station signals to the remote unit, and compensates for time delay corresponding to a path between the first main unit and the second main unit with respect to the first group of base station signals before transmitting the first and second groups of base station signals to the remote unit.

According to another aspect of the present invention, a distributed antenna system that receives a base station signal from at least one base station and transmits the base station signal to at least one user terminal, the distributed antenna system includes a first main unit for receiving a first group of base station signals; a second main unit for receiving a second group of base station signals; a hub unit for receiving the first group of base station signals from the first main unit, and receiving the second group of base station signals from the second main unit; and at least one remote unit for receiving the first and second groups of base station signals from the hub unit and combining the first and second groups of base station signals, wherein the first main unit compensates for time delay corresponding to paths between the first and second main units and the hub unit with respect to the first group of base station signals.

The present invention may provide, when a combination of signals at headend nodes, a combination of signals at hub nodes, or a combination of signals at remote nodes is required, a main unit for compensating for time delay over a plurality of operations to ensure the quality of relayed signals by compensating for time delay that occurs due to a combination of the above-mentioned signals in a main unit in advance, and a distributed antenna system including the main unit.

DETAILED DESCRIPTION OF EXEMPLARY EMBODIMENTS

Since the present invention may have diverse modified embodiments, preferred embodiments are illustrated in the drawings and are described in the detailed description. However, this does not limit the present invention within specific embodiments and it should be understood that the present invention covers all the modifications, equivalents, and replacements within the idea and technical scope of the present invention.

In the description of the present invention, certain detailed explanations of the related art are omitted when it is deemed that they may unnecessarily obscure the essence of the present invention. In addition, numeral figures (for example, 1, 2, and the like) used during describing the specification are just identification symbols for distinguishing one element from another element. Further, in the specification, if it is described that one component is "connected" or "accesses" the other component, it is understood that the one component may be directly connected to or may directly access the other component but unless explicitly described to the contrary, another component may be "connected" or "access" between the components. In addition, terms including "unit", "er", "or", "module", and the like disclosed in the specification mean a unit that processes at least one function or operation and this may be implemented by hardware or software or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

A distributed antenna system according to an embodiment of the present invention is a coverage system for in-building and/or outdoor services that deliver voice communication and data communication with high quality and seamless access. The distributed antenna system according to an embodiment of the present invention is also a system for servicing analog and/or digital telephone systems serviced in multiple bands. The distributed antenna system according to an embodiment of the present invention may be installed in general public institutions and private facilities such as a shopping mall, a hotel, a campus, an airport, a hospital, a subway, a sports complex, and a convention center. The distributed antenna system according to an embodiment of the present invention improves a poor propagation environment in a building, improves a poor received signal strength indication (RSSI) and the overall reception sensitivity of a mobile terminal, chip energy/other interferences (Ec/Io), and provides a mobile communication service to every corner of the building so that a user of the mobile communication service can freely talk anywhere in the building. The distributed antenna system according to an embodiment of the present invention may support the mobile communication standard used worldwide.

For example, the distributed antenna system may support a time division duplex (TDD) service as well as a frequency division duplex (FDD) service, a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the distributed antenna system may support a number of mobile communication standards such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), and so on. Hereinafter, embodiments of the present invention will be described in detail.

Figure 1:
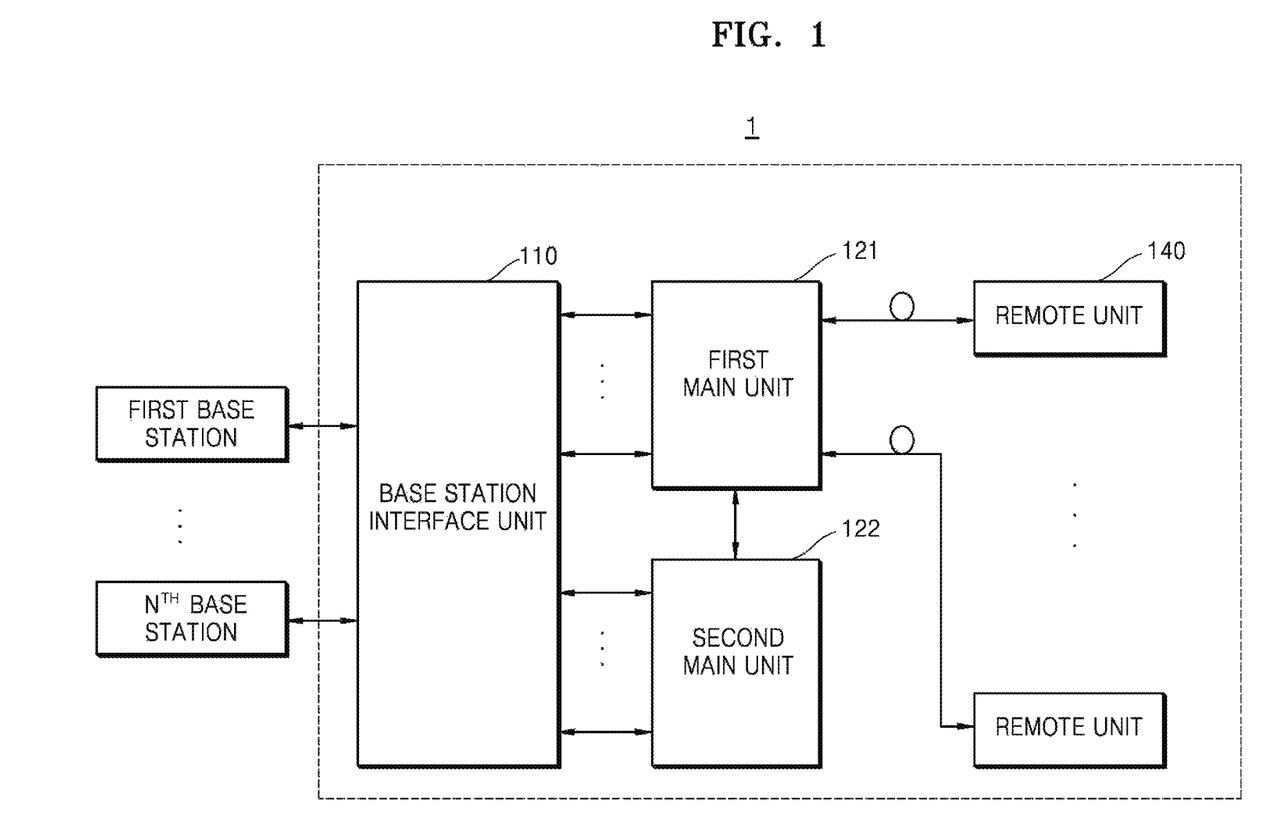
FIG. 1 is a block diagram of a topology of a distributed antenna system to which a main unit may be applied, according to an embodiment of the present invention.

FIG. 1 is a block diagram of a topology of a distributed antenna system to which a main unit may be applied, according to an embodiment of the present invention.

Referring to FIG. 1, a distributed antenna system 1 may perform a relay function by amplifying a base station signal and transmitting the amplified base station signal to a user terminal (not shown), and by amplifying a terminal signal and transmitting the amplified terminal signal to a base transceiver station (BTS).

In order to perform such a relay function, the distributed antenna system 1 may include a base station interface unit 110 constituting headend nodes, main units 121 and 122, and a plurality of remote units 140 arranged at respective remote service locations.

The distributed antenna system 1 may be implemented by an analog distributed antenna system or a digital distributed antenna system, and in some cases may be implemented by a mixed form thereof (i.e., some nodes perform analog processing and the remaining nodes perform digital processing).

However, FIG. 1 shows an example of the topology of the distributed antenna system 1 and the distributed antenna system 1 may be transformed into various topologies considering specificity of installation areas and application fields (e.g., in-building, a subway, a hospital, a stadium, etc.). In this regard, the number of the base station interface unit 110, the main units 121 and 122, and the remote units 140, and a connection relationship between upper and lower ends thereof may be different from those of FIG. 1. Hereinafter, nodes in the distributed antenna system 1 and respective functions thereof will be described in more detail.

The base station interface unit 110 may serve as an interface between base stations and the main units 121 and 122 in the distributed antenna system 1. FIG. 1 shows a case where the base station interface unit 110 is connected to a plurality of base stations (first to $n^{th}$ base stations, where n is a natural number of 2 or more). However, the base station interface unit 110 may be provided for each service provider, each frequency band, and each sector.

In general, since a radio frequency (RF) signal transmitted from a base station is a high-power signal, the base station interface unit 110 may adjust a power level of the high-power RF signal so as to be suitable for processing in the main units 121 and 122, and may transmit a low-power RF signal with the adjusted power level to the main units 121 and 122.

As shown in FIG. 1, when the base station interface unit 110 lowers a high-power RF signal in each frequency band (or each service provider or sector) and transmits them in parallel to the main units 121 and 122, the main units 121 and 122 may combine low-power RF signals and distribute the combined signals to the remote units 140.

Here, when the distributed antenna system 1 is implemented as a digital distributed antenna system, the base station interface unit 110 may digitize the low-power RF signals and transmit them to the main units 121 and 122 in parallel, and the main units 121 and 122 may combine the digitized low-power RF signals and distribute them to the remote units 140. Alternatively, the main units 121 and 122 may digitize and combine the low-power RF signals transmitted from the base station interface unit 110, and may distribute the combined signals to the remote units 140.

The main units 121 and 122 may perform appropriate signal processing such as filtering for the low-power RF signals transmitted from the base station interface unit 110, processing for high speed communication, and the like.

In the distributed antenna system 1 of FIG. 1, the main units 121 and 122 include a first main unit 121 and a second main unit 122 coupled with each other. The first main unit 121 may receive a first group of base station signals from the base station interface unit 110 and may perform signal processing and combining of the first group of base station signals. The second main unit 122 may receive a second group of base station signals from the base station interface unit 110 and may perform signal processing and combining of the second group of base station signals. The first main unit 121 receives the second group of base station signals from the second main unit 122 and combines them with the first group of base station signals, and distributes the combined signals to the remote units 140.

Each of the remote units 140 may separate the received combined signals by frequency band and perform signal processing (analog signal processing for an analog distributed antenna system (DAS), digital signal processing for digital DAS) such as amplification. Accordingly, each of the remote units 140 may transmit a base station signal to a user terminal in service coverage of the remote units 140 through a service antenna (not shown). An additional remote unit may be connected to the lower end of the remote units 140.

Meanwhile, FIG. 1 shows that a base station and the base station interface unit 110, the base station interface unit 110 and the main units 121 and 122 are respectively connected to each other via an RF cable, and the main units 121 and 122 and the remote units 14 are respectively connected to each other through an optical cable. However, a signal transmission medium between each node may vary.

As an example, the base station interface unit 110 and the main units 121 and 122 may be connected to each other through an RF cable, or may be connected to each other through an optical cable or a digital interface. As another example, the main units 121 and 122 and the remote units 140 may be connected to each other through an RF cable, a twisted cable, a UTP cable or the like in addition to the optical cable.

However, the following description will be made with reference to FIG. 1. Therefore, in the present embodiment, the main units 121 and 122 and the remote units 140 may include an optical transceiver module for transmitting and receiving optical signals through electro-optical conversion/photoelectric conversion, and may further include a wavelength division multiplexing (WDM) device when nodes are connected to each other by a single optical cable.

The distributed antenna system 1 may be connected to an external management device (not shown) such as a network management server or a network management system (NMS) via a network. Accordingly, an administrator may remotely monitor the status and problem of each node of the distributed antenna system 1, and may remotely control the operation of each node.

Figure 2:
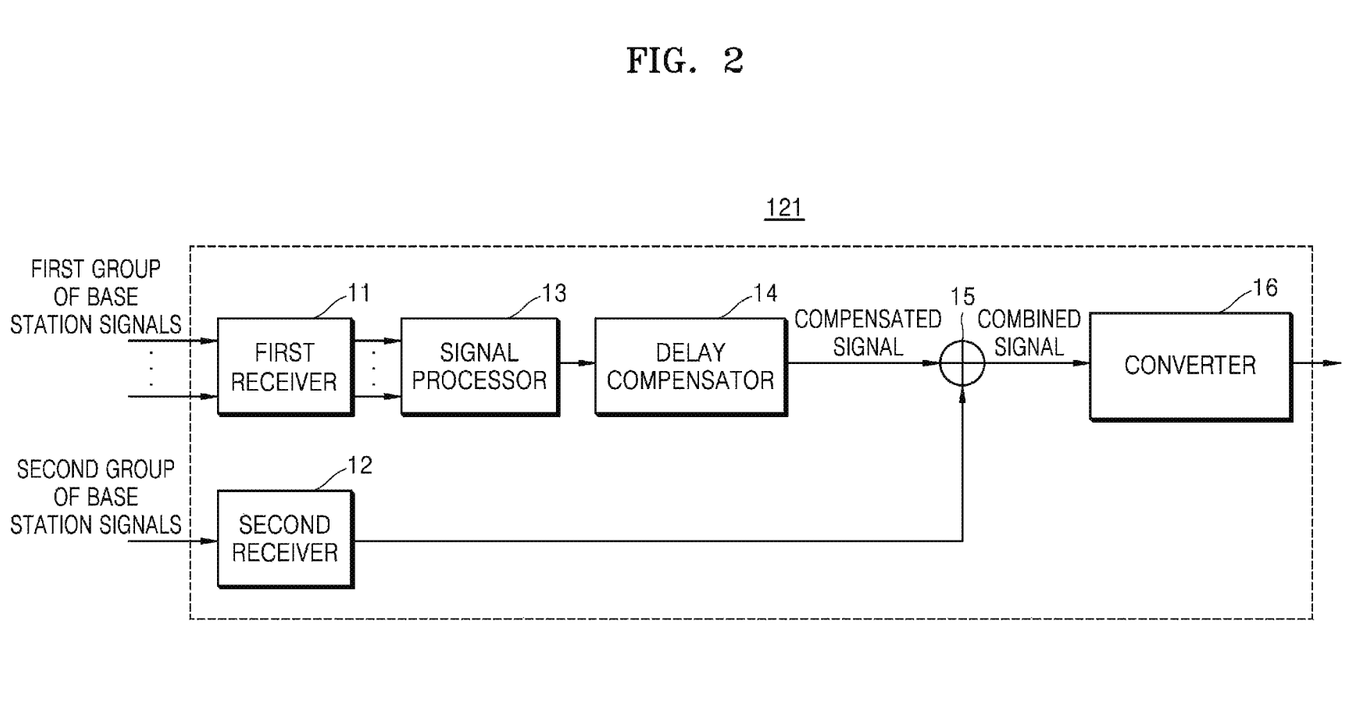
FIG. 2 is a block diagram of a configuration of the main unit shown in FIG. 1.

FIG. 2 is a block diagram of a configuration of the first main unit 121 shown in FIG. 1. Since an uplink performs the reverse process of a downlink, only the configuration of the first main unit 121 and functions thereof will be described with respect to a downlink direction for convenience of explanation.

Referring to FIG. 2, the first main unit 121 includes a first receiver 11 for receiving a first group of base station signals from the base station interface unit 110, a second receiver 12 for receiving a second group of base station signals from the second main unit 122, a signal processor 13 for performing signal processing and combining of the first group of base station signals, a signal combiner 15 for combining the first and second groups of base station signals, and a converter 16 for optical-electrical converting the combined signals and transmitting them to the remote units 140.

In the distributed antenna system 1 of FIG. 1, since time delay occurs in a process of transmitting the second group of base station signals from the second main unit 122 to the first main unit 121, the first main unit 121 further includes a delay compensator 14 for compensating for time delay corresponding to a path between the first main unit 121 and the second main unit 122 with respect to the first group of base station signals before combining the first and second groups of base station signals. The delay compensator 14 may store information about a delay time corresponding to the second group of base station signals and may, based on the stored information, compensate for the time delay corresponding to the path between the first main unit 121 and the second main unit 122 with respect to the first group of base station signals. For example, it is assumed that the first main unit 121 and the second main unit 122 are spaced apart from each other by 5 [km] and the information about the delay time for the second group of base station signals corresponds to 0.5 [ms]. In this case, the delay compensator 14 may compensate for a phase of the first group of base station signals by a time corresponding to 0.5 [ms] and output the compensated signals.

Although the delay compensator 14 compensates for delay of the first group of base station signals in FIG. 2, the delay compensator 14 may be connected to the second receiver 12 to compensate for delay of the second group of base station signals. Because the delay compensator 14 is a component for performing synchronization between the first group of base station signals and the second group of base station signals. As for a method of measuring time delay, various methods well known in the technical field of the present invention may be used, and a detailed explanation of the methods may be omitted to avoid unnecessarily obscuring the subject matter of the present invention.

Meanwhile, time delay according to a distance between the first main unit 121 and the remote units 140 may be compensated for by each of the remote units 140 based on a remote unit 140 located at the longest distance as in the prior art.

Figure 3:
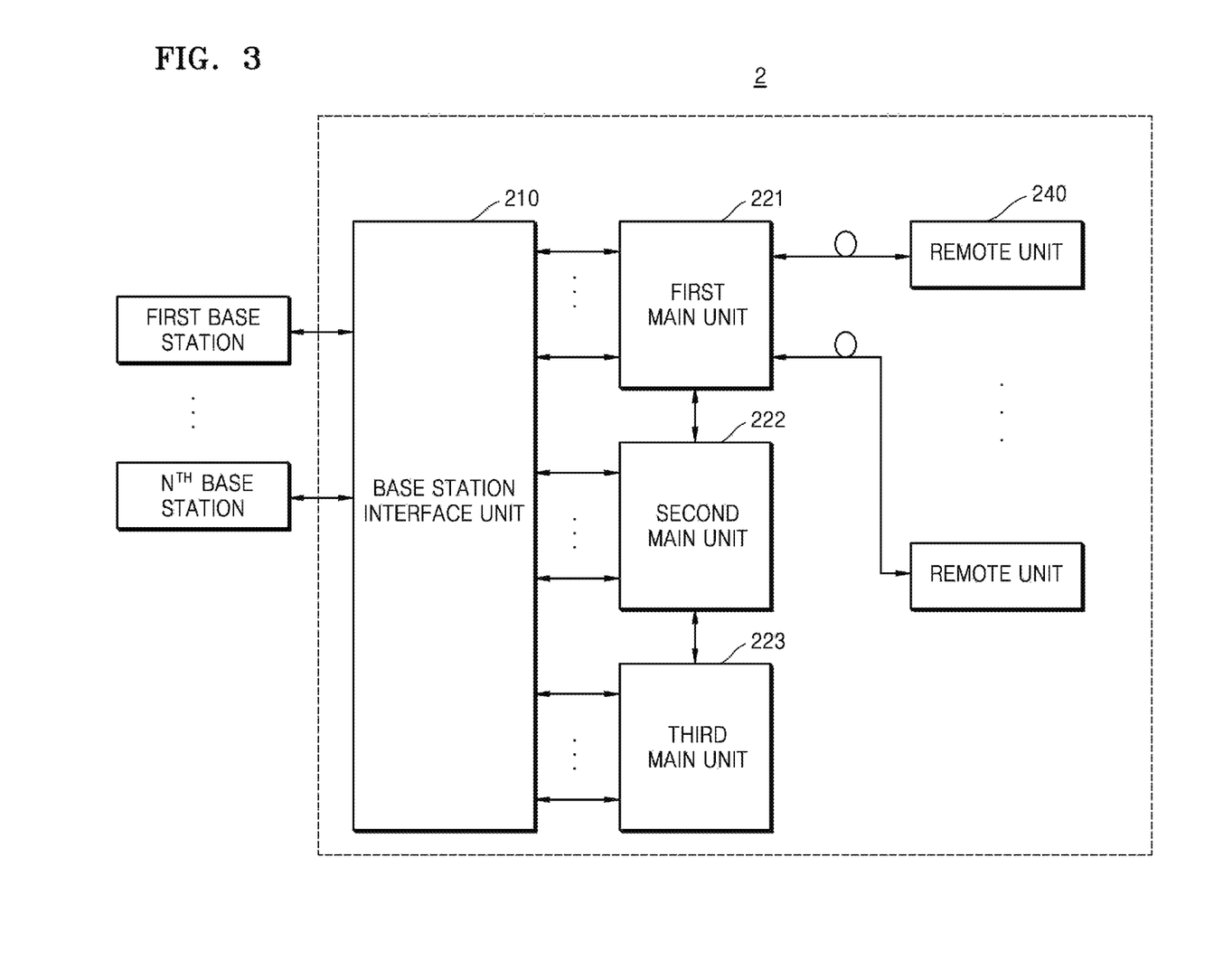
FIG. 3 is a block diagram of a variation of a topology of a distributed antenna system to which a main unit may be applied, according to an embodiment of the present invention.

FIG. 3 is a block diagram of a variation of a topology of a distributed antenna system to which a main unit may be applied, according to an embodiment of the present invention. For convenience of description, a difference from the distributed antenna system 1 of FIG. 1 will be mainly described.

In a distributed antenna system 2 of FIG. 3, main units 221, 222, and 223 include a first main unit 221, a second main unit 222, and a third main unit 223 coupled with each other.

The first main unit 221 may receive a first group of base station signals from a base station interface unit 210 and may perform signal processing and combining of the first group of base station signals. The second main unit 222 may receive a second group of base station signals from the base station interface unit 210 and may perform signal processing and combining of the second group of base station signals. The third main unit 223 may receive a third group of base station signals from the base station interface unit 210 and may perform signal processing and combining of the third group of base station signals.

The second main unit 222 receives the third group of base station signals from the third main unit 223 and combines them with the second group of base station signals, and transmits the combined signals to the first main unit 221. Here, the second main unit 222 may delay-compensate for the second group of base station signals to synchronize the third group of base station signals received from the third main unit 223 with the second group of base station signals.

The first main unit 221 receives the second and third groups of base station signals from the second main unit 222 and combines them with the first group of base station signals, and distributes the combined signals to remote units 240. Here, the first main unit 221 may delay-compensate for the first group of base station signals to synchronize the first group of base station signals with the combined signals of the second and third groups of base station signals received from the second main unit 222.

Although not clearly shown in FIG. 3, the second main unit 222 is different from the first main unit 121 described with reference to FIG. 2 in that signals combined by a signal combiner may be transmitted to the first main unit 221. Although three main units are coupled with each other in FIG. 3, the present invention is not limited thereto. In a case where three or more main units are cascade-connected to each other, substantially the same or similar method as in FIG. 3 may be applied.

Figure 4:
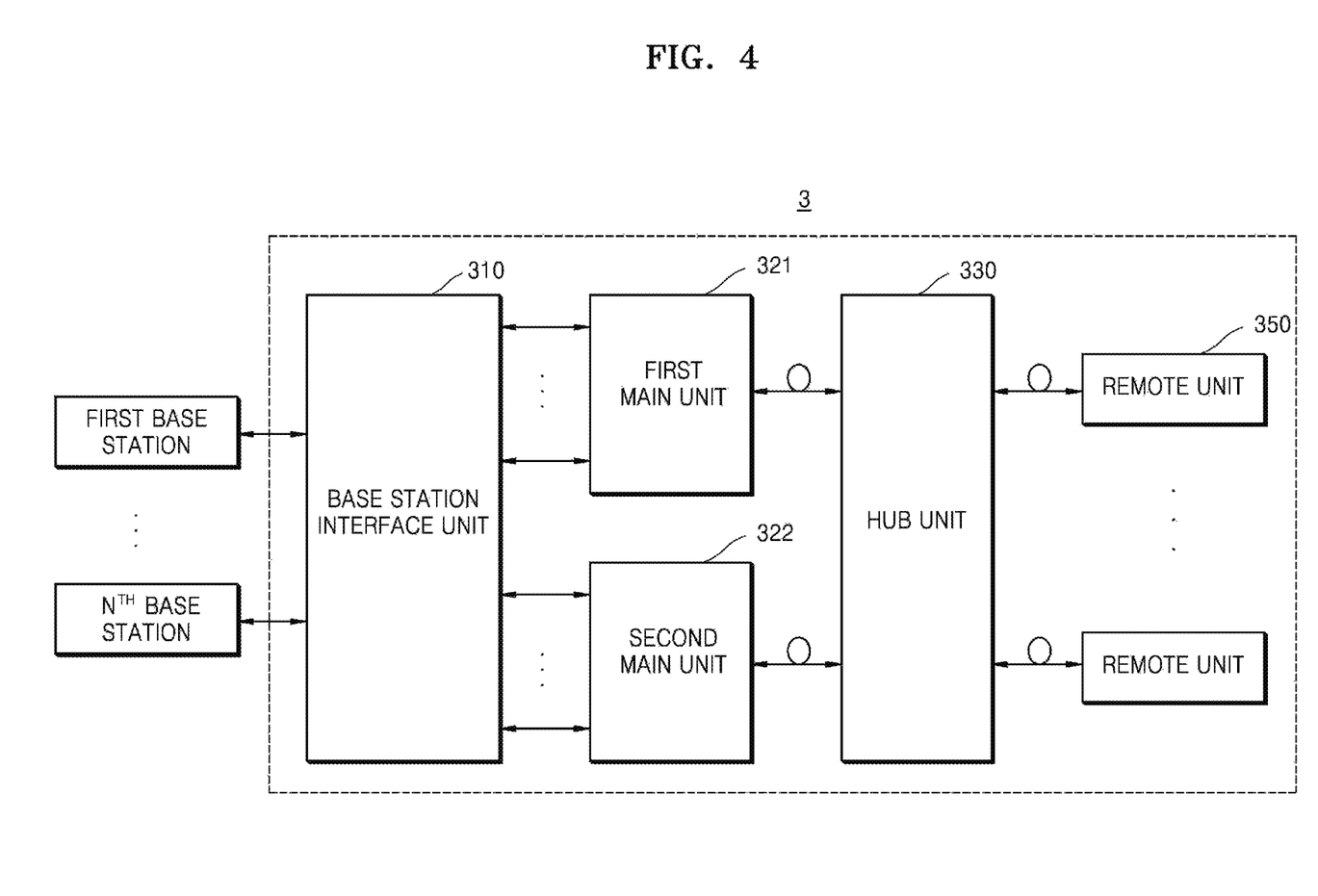
FIG. 4 is a block diagram of a topology of a distributed antenna system to which a main unit may be applied, according to another embodiment of the present invention.

FIG. 4 is a block diagram of a topology of a distributed antenna system to which a main unit may be applied, according to another embodiment of the present invention. For convenience of description, a difference from the distributed antenna system 1 of FIG. 1 will be mainly described.

Referring to FIG. 4, a distributed antenna system 3 includes a hub unit 330 constituting an extension node. The hub unit 330 may be utilized when the number of branches to be branched into a star structure from main units 321 and 322 is limited as compared with the number of remote units 350 to be installed.

In the distributed antenna system 3 of FIG. 4, the main units 321 and 322 include a first main unit 321 and a second main unit 322. The first main unit 321 receives a first group of base station signals from a base station interface unit 310 and performs signal processing and combining of the first group of base station signals, and transmits the combined signals to the hub unit 330. The second main unit 322 receives a second group of base station signals from a base station interface unit 320 and performs signal processing and combining of the second group of base station signals, and transmits the combined signals to the hub unit 330.

The hub unit 330 combines the first and second groups of base station signals received from the first and second main units 321 and 322 and distributes the combined signals to the remote units 350. The hub unit 330, based on any base station signals (e.g., the first group of base station signals), may compensate for delay of other base station signals (e.g., the second group of base station signals) in order to synchronize the first group of base station signals received from the first main unit 321 with the second group of base station signals received from the second main unit 322. For example, it is assumed that the first main unit 321 and the hub unit 330 are spaced apart from each other by 5 [km] and the second main unit 322 and the hub unit 330 are spaced apart from each other by 2.5 [km]. Here, it is assumed that a delay time for the first group of base station signals corresponds to 0.5 [ms], and a delay time for the first group of base station signals corresponds to 0.2 [ms]. The hub unit 330 may compensate for delay of the second group of base station signals based on the first group of base station signals. The hub unit 330 may compensate for a phase of the second group of base station signals by a time corresponding to 0.3 [ms].

Meanwhile, time delay may occur in a process in which the hub unit 330 receives base station signals from each of the first and second main units 321 and 322. A method of compensating for the time delay between the main units and the hub unit 330 will be described later below with reference to FIG. 5.

Figure 5:
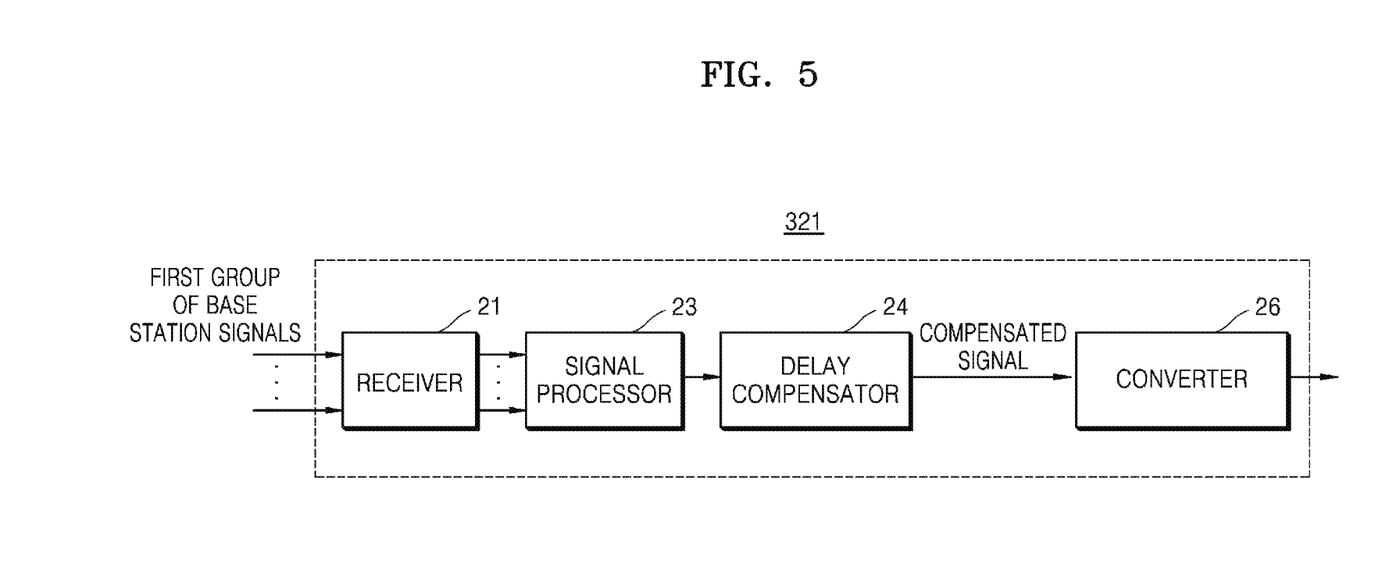
FIG. 5 is a block diagram of a configuration of the main unit shown in FIG. 4.

FIG. 5 is a block diagram of a configuration of the main unit 321 shown in FIG. 4. Since the first main unit 321 and the second main unit 322 are substantially the same, only the configuration of the first main unit 321 and functions thereof will be described for convenience of explanation. Since an uplink performs the reverse process of a downlink, only the configuration of the first main unit 321 and functions thereof will be described with respect to a downlink direction for convenience of explanation.

Referring to FIG. 5, the first main unit 321 includes a receiver 21 for receiving a first group of base station signals from the base station interface unit 310, a signal processor 23 for performing signal processing and combining of the first group of base station signals, and a converter 26 for optical-electrical converting the combined signals and transmitting them to the hub unit 330.

In the distributed antenna system 3 of FIG. 4, since time delay occurs in a process of transmitting the first and second groups of base station signals from the first and second main units 321 and 322 to the hub unit 330, respectively, the first main unit 321 further includes a delay compensator 24 for compensating for time delay corresponding to paths between the first and second main units 321 and 322 and the hub unit 330 with respect to the first group of base station signals before transmitting the first group of base station signals to the hub unit 330.

The time delay occurring in the path between the first main unit 321 and the hub unit 330 and the time delay occurring in the path between the second main unit 322 and the hub unit 330 may be measured respectively, and a signal delayed relatively shortly based on maximum time delay may be compensated for the time delay.

Meanwhile, it is apparent that the hub unit 330 other than the main units 321 and 322 may also compensate for the time delay. In addition, although two main units are connected to the hub unit in parallel and coupled with each other in FIG. 4, the present invention is not limited thereto. In a case where two or more main units are connected in parallel to the hub unit and coupled with each other, substantially the same method as in FIG. 4 may be applied.

Figure 6:
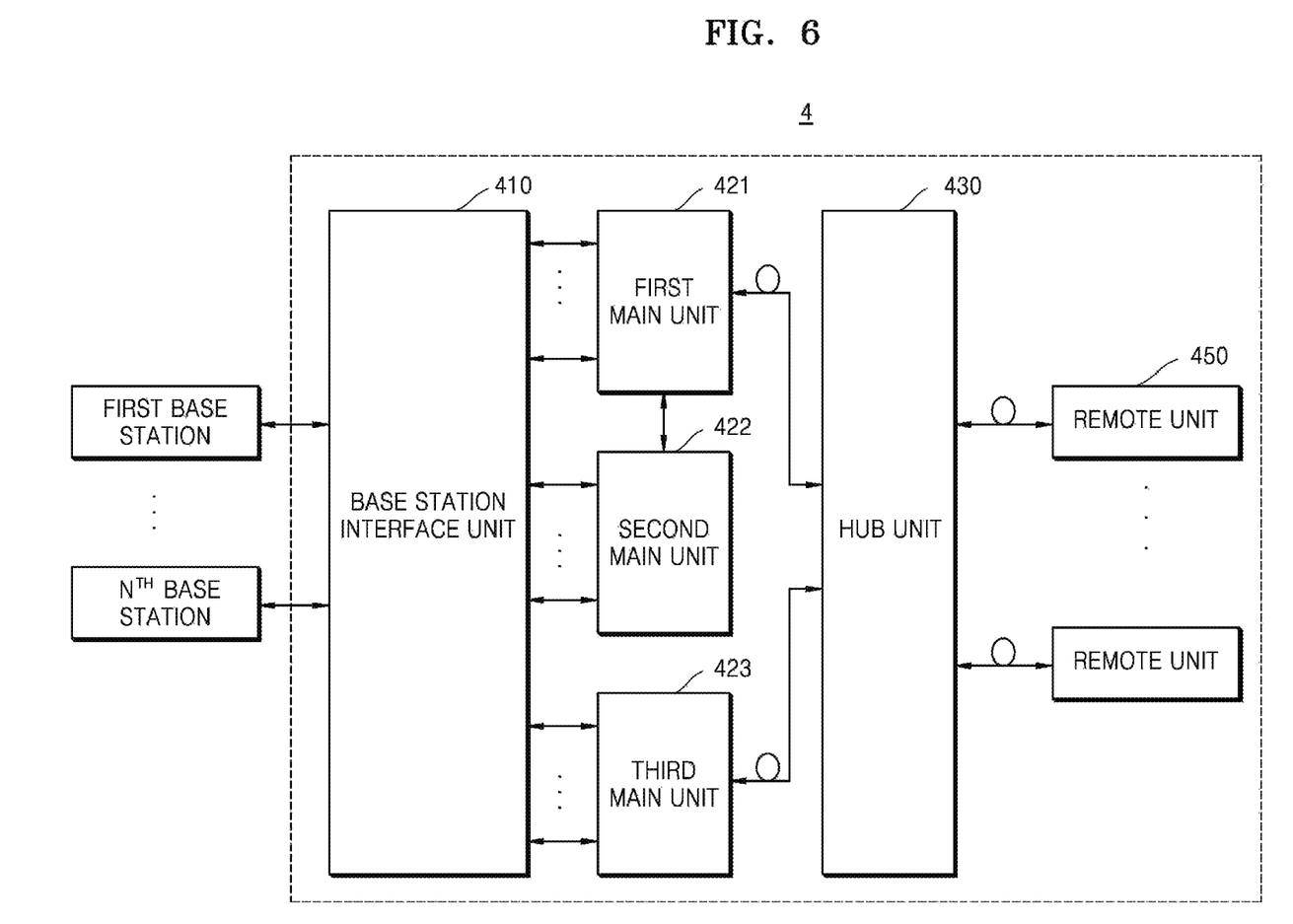
FIG. 6 is a block diagram of a topology of a distributed antenna system to which a main unit may be applied, according to another embodiment of the present invention.

FIG. 6 is a block diagram of a topology of a distributed antenna system to which a main unit may be applied, according to another embodiment of the present invention. For convenience of description, a difference from the distributed antenna systems 1 and 3 of FIGS. 1 and 4 will be mainly described.

In a distributed antenna system 4 of FIG. 6, main units 421, 422, and 423 include a first main unit 421 and a second main unit 422 coupled with each other, and a third main unit 423 which is coupled with a hub unit 430 together with the first main unit 421.

The first main unit 421 may receive a first group of base station signals from a base station interface unit 410 and may perform signal processing and combining of the first group of base station signals. The second main unit 422 may receive a second group of base station signals from the base station interface unit 410 and may perform signal processing and combining of the second group of base station signals. The first main unit 421 may receive the second group of base station signals from the second main unit 422 and may compensate for delay for the first group of base station signals based on a delay time generated when the second main unit 422 transmits signals to the first main unit 421. Thereafter, the first main unit 421 combines the delay-compensated first group of base station signals and the second group of base station signals and transmits the combined signals to the hub unit 430. Here, the first main unit 421 may compensate for time delay corresponding to the path between the first main unit 321 and the hub unit 330 with respect to the combined base station signals.

And, the third main unit 423 receives a third group of base station signals from the base station interface unit 410 and performs signal processing and combining of the third group of base station signals, and transmits the combined signals to the hub unit 430. Here, after compensating for delay for the third group of base station signals based on a delay time of the combined signals transmitted to the hub unit 430 by the first main unit 421, the third main unit 423 may transmit the compensated signals to the hub unit 430. Also, the third main unit 423 may compensate for time delay corresponding to a path between the third main unit 423 and the hub unit 430 with respect to the third group of base station signals.

Accordingly, the hub unit 430 may receive synchronized first to third groups of base station signals. Accordingly, the hub unit 430 combines the first and third groups of base station signals received from the first and third main units 421 and 423 and distributes the combined signals to remote units 450. The time delay compensation method applied to the distributed antenna systems 1 and 3 of FIGS. 1 and 4 may be applied to the distributed antenna system 4 of FIG. 6, in combination.

Figure 7:
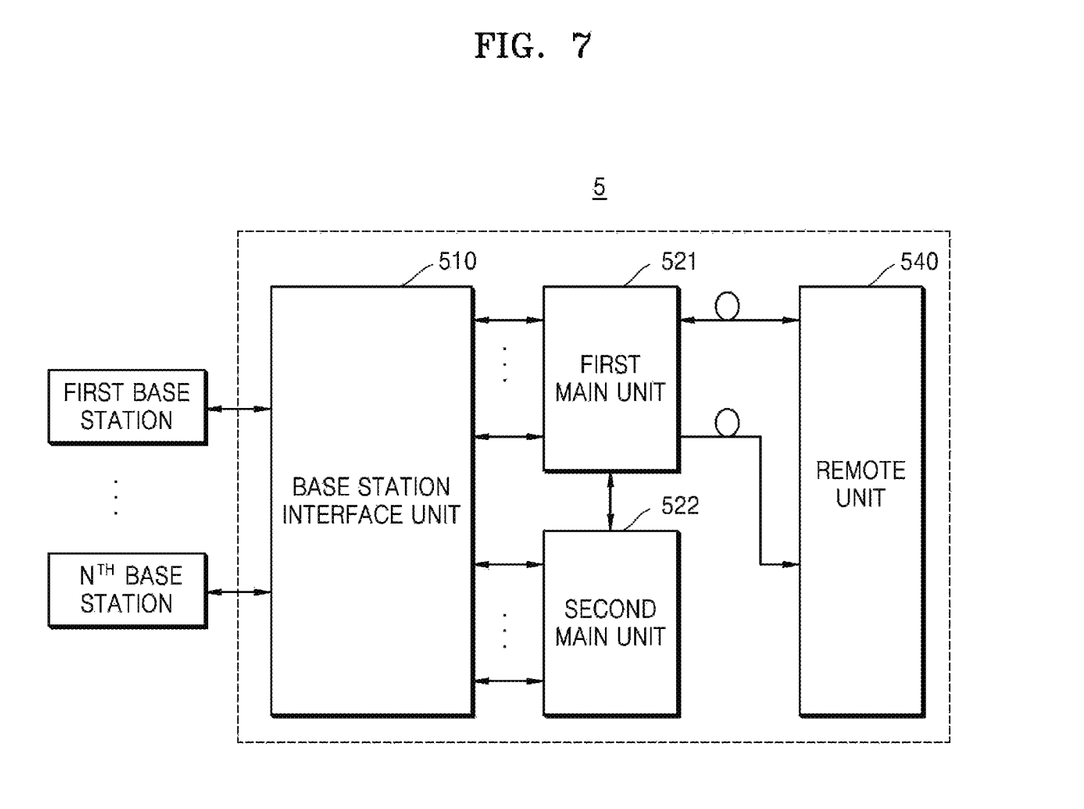
FIG. 7 is a block diagram of a topology of a distributed antenna system to which a main unit may be applied, according to another embodiment of the present invention.

FIG. 7 is a block diagram of a topology of a distributed antenna system to which a main unit may be applied, according to another embodiment of the present invention. For convenience of description, a difference from the distributed antenna system 1 of FIG. 1 will be mainly described.

In a distributed antenna system 5 of FIG. 7, main units 521 and 522 include a first main unit 521 and a second main unit 522 coupled with each other. The first main unit 521 may receive a first group of base station signals from a base station interface unit 510 and may perform signal processing and combining of the first group of base station signals. The second main unit 522 may receive a second group of base station signals from the base station interface unit 510 and may perform signal processing and combining of the second group of base station signals. The first main unit 521 receives the second group of base station signals from the second main unit 522 and distributes the first and second groups of base station signals to a remote unit 540.

The remote unit 540 may combine the first and second groups of base station signals. An additional remote unit may be connected to a lower end of the remote unit 540. The remote unit 540 may transmit the combined signals to the remote unit connected to the lower end.

In the distributed antenna system 5 of FIG. 7, since time delay occurs in a process of transmitting the second group of base station signals from the second main unit 122 to the first main unit 121, the first main unit 521 compensates for time delay corresponding to a path between the first main unit 521 and the second main unit 522 with respect to the first group of base station signals before transmitting the first and second groups of base station signals to the remote unit 540.

Although not clearly shown, compared with the first main unit 121 described with reference to FIG. 2, the first main unit 521 may be configured such that each of the first and second groups of base station signals is converted and transmitted to the remote unit 540 without including a signal combiner. The remote unit 540 or a hub unit (not shown in FIG. 7) other than the first main unit 521 may compensate for the time delay.

Figure 8:
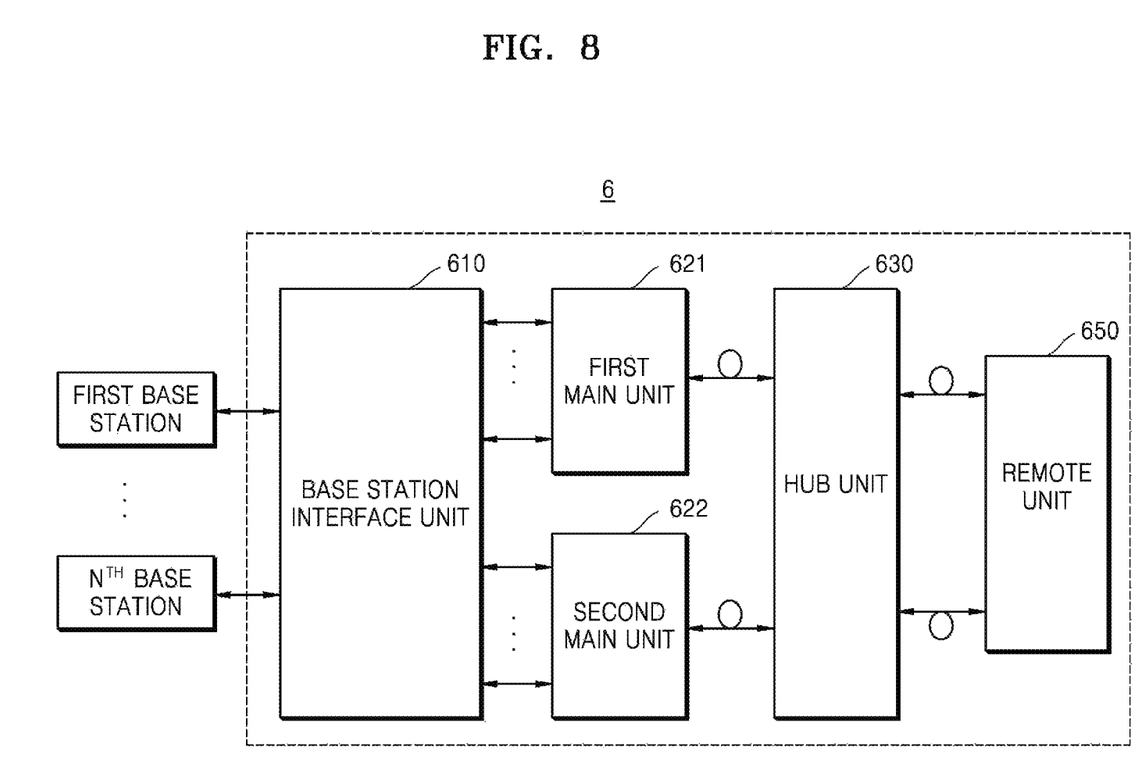
FIG. 8 is a block diagram of a topology of a distributed antenna system to which a main unit may be applied, according to another embodiment of the present invention.

FIG. 8 is a block diagram of a topology of a distributed antenna system to which a main unit may be applied, according to another embodiment of the present invention. For convenience of description, a difference from the distributed antenna system 3 of FIG. 4 will be mainly described.

In a distributed antenna system 6 of FIG. 8, main units 621 and 622 include a first main unit 621 and a second main unit 622. The first main unit 621 receives a first group of base station signals from a base station interface unit 610 and performs signal processing and combining of the first group of base station signals, and transmits the combined signals to a hub unit 630. The second main unit 622 receives a second group of base station signals from the base station interface unit 610 and performs signal processing and combining of the second group of base station signals, and transmits the combined signals to the hub unit 630.

The hub unit 630 distributes the first and second groups of base station signals received from the first and second main units 621 and 622 to a remote unit 650.

The remote unit 650 may combine the first and second groups of base station signals. An additional remote unit may be connected to a lower end of the remote unit 650. The remote unit 650 may transmit the combined signals to the remote unit connected to the lower end.

In the distributed antenna system 6 of FIG. 8, since time delay occurs in a process of transmitting the first and second groups of base station signals from the first and second main units 621 and 622 to the hub unit 630, respectively, the first main unit 621 may compensate for time delay corresponding to paths between the first and second main units 621 and 622 and the hub unit 630 with respect to the first group of base station signals before transmitting the first group of base station signals to the hub unit 630 (when the first group of base station signals is delayed relatively shortly). The remote unit 650 other than the main units 621 and 622 may compensate for the time delay.

While the embodiments have been particularly shown and described, it will be understood by one of ordinary skill in the art that various changes in form and details may be made therein without departing from the spirit and scope of the present invention as defined by the appended claims.

What is claimed is:

1. A first main unit of a distributed antenna system, the first main unit comprising at least one processor to implement:
   a first receiver for receiving a first group of base station signals directly from a base station interface unit;
   a second receiver for receiving a second group of base station signals from the base station interface unit through a second main unit;
   a signal combiner for combining the first and second groups of base station signals; and
   a delay compensator for compensating for a signal path delay between the first main unit and the second main unit with respect to the first group of base station signals before combining the first and second groups of base station signals;
   wherein the first group of base station signals and the second group of base station signals are different base station signals, and the first group of base station signals and the second group of base station signals are transmitted together in a combined form to at least one remote unit or a hub unit of the distributed antenna system, and
   wherein the signal path delay between the first main unit and the second main unit includes a time delay according to a separated distance between the first main unit and the second main unit.

2. The first main unit of claim 1, further comprising:
   a converter configured to convert the combined first and second groups of base station signals to correspond to a transport medium and transmit the combined first and second groups of base station signals to the at least one remote unit.

3. The first main unit of claim 1, further comprising: a converter configured to convert the combined first and second groups of base station signals to correspond to a transport medium and transmit the combined first and second groups of base station signals to the hub unit.

4. A distributed antenna system comprising:
   a first main unit for receiving a first group of base station signals directly from a base station interface unit;
   a second main unit for receiving a second group of base station signals directly from the base station interface unit; and
   a third main unit for receiving a third group of base station signals directly from the base station interface unit,
   wherein the first main unit, the second main unit, and the third main unit are cascade-connected to each other,
   wherein the second main unit combines the second and third groups of base station signals, and compensates for a first signal path delay between the second main unit and the third main unit with respect to the second group of base station signals before combining the second and third groups of base station signals,
   wherein the first signal path delay includes a time delay according to a separated distance between the second main unit and the third main unit, and
   wherein the first main unit receives the combined second and third groups of base station signals and combines the first group of base station signals and the combined second and third groups of base station signals, and compensates for a second signal path delay between the first main unit and the second main unit with respect to the first group of base station signals before combining the first group of base station signals and the second and third groups of base station signals,
   wherein the second signal path delay includes a time delay according to a separated distance between the first main unit and the second main unit, and
   wherein the first group of base station signals, the second group of base station signals, and the third group of base station signals are different base station signals, and the first group of base station signals and the second group of base station signals are transmitted together in a combined form to at least one remote unit or a hub unit of the distributed antenna system.

* * * * *